United States Patent [19]

Suozzo

[11] 4,194,598

[45] Mar. 25, 1980

[54] MECHANICAL SHOCK AND SWAY ARRESTOR

[76] Inventor: Leonard S. Suozzo, 366 Maple Hill Dr., Hackensack, N.J. 07601

[21] Appl. No.: 967,968

[22] Filed: Dec. 11, 1978

[51] Int. Cl.² ............................................. B60T 7/12
[52] U.S. Cl. .................................. 188/134; 188/1 B; 188/129; 248/636
[58] Field of Search ...................... 188/1 B, 134, 129; 248/561, 563, 636

[56] References Cited

U.S. PATENT DOCUMENTS

| | | | |
|---|---|---|---|
| 1,896,904 | 2/1933 | Laven | 188/129 |
| 3,809,186 | 5/1974 | Suozzo | 188/1 B |
| 4,094,387 | 6/1978 | Pelat et al. | 188/1 B |

Primary Examiner—George E. A. Halvosa
Attorney, Agent, or Firm—Thomas E. Tate

[57] ABSTRACT

The disclosure is that of an invention directed to a mechanical shock and sway arrestor to be interposed between piping, related equipment and a stationary support. The parts are constructed and arranged to automatically change the effective length of the arrestor in response to thermally induced movements of the piping and to substantially instantaneously convert the arrestor into a rigid strut in the event that the piping is subjected to shock loading or vibration of substantial amplitude.

5 Claims, 5 Drawing Figures

MECHANICAL SHOCK AND SWAY ARRESTOR

THE INVENTION

This invention relates generally to those types of mechanical shock and sway arrestors that are adapted to be interposed between high temperature, high pressure piping or related equipment and a stationary structure to permit normal thermally induced movement of the piping and to instantly convert to a rigid strut whenever the piping is subjected to shock loading or vibration of substantial amplitude.

It should be understood that arrestors of the types to which this invention relates are made in various sizes, each of which is designed to accomodate a certain maximum static load through a predetermined range of travel of the supported piping or related equipment and each of which must be capable, within its design limited; (1) to automatically adjust its effective length to thermally induced changes in positions of the supported piping or related equipment; (2) to absorb vibrations of small amplitude without any change in the effective length; (3) to substantially instantaneously convert to a rigid strut in the event of quickly applied seismic or other shock or vibration forces of substantial magnitude; and (4) to provide a certain degree of "release" in the event that such seismic or other shock or vibration forces should continue.

A typical example of such shock and sway arrestors is disclosed and claimed in U.S. Pat. No. 3,809,186 and this invention is particularly directed to improvements over the form of device illustrated in FIG. 5 of that patent.

Although that device has functioned adequately in several different types of installations, it has been observed that improvements are needed to simplify and strengthen the construction, readily absorb small amplitude vibrations, to reduce friction between the relatively movable parts and to provide "release" when an applied force is continued.

The problem of "release" arises when the arrestor has been converted into a rigid strut as the result of shock loading and any continuing forces must be relieved by appropriate automatic adjustment of the effective length of the arrestor.

Therefore, an object of this invention is to provide an improved mechanical shock and sway arrestor which permits normal thermally induced movements of the associated piping while being instantly convertible into a rigid strut whenever the piping is subjected to shock loading or vibration of substantial amplitude.

Another object of this invention is to provide a shock and sway arrestor of the character stated that is constructed to provide relief whenever forces applied by shock loading should continue for an appreciable period of time.

Another object of this invention is to provide a shock and sway arrestor of the character stated that is constructed to provide a minimum of friction between the relatively movable parts.

A further object of this invention is to provide a shock and sway arrestor of the character stated that is simple in design, rugged in construction and economical to manufacture.

With these and other objects, the nature of which will become apparent, the invention will be more fully understood by reference to the drawings, the accompanying detailed description and the appended claims.

In the drawings:

FIG. 1 is a longitudinal section, partly in elevation, of the prior art device shown in FIG. 5 of U.S. Pat. No. 3,809,186 and using the same reference numerals;

Figure 2:
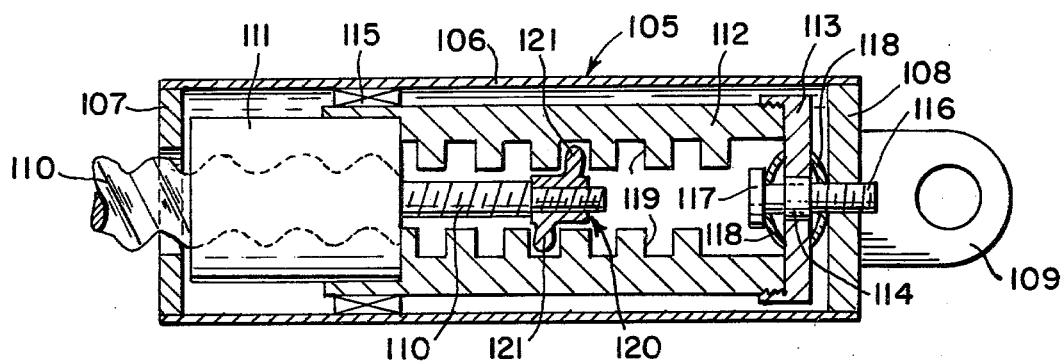
FIG. 2 is a longitudinal section of the improved mechanical shock and sway arrestor constructed in accordance with this invention.
Figure 4:
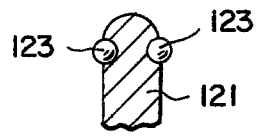
Figure 5:
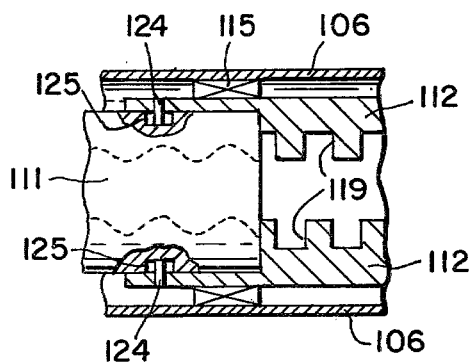

FIG. 4 is a detail longitudinal section of another modification of the single turn threaded element and shows the use of pairs of oppositely disposed ball bearings to further reduce friction; and FIG. 5 is detail longitudinal section of a portion of FIG. 2 but showing a modification of the connection between the ball nut and the tubular extension thereof to enable a limited amount of axial movement to take place therebetween.

Figure 1:
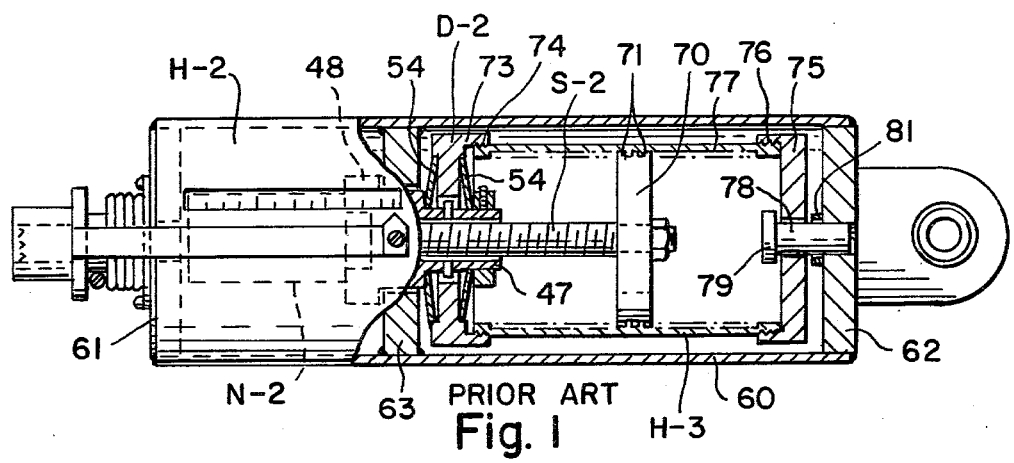

Before describing the present invention in detail, a brief description of the prior art construction of FIG. 1 will be presented in order that the improvements of the present invention may be more clearly recognized and understood.

The prior art device of FIG. 1 is said to comprise a housing H-2, a screw member S-2, a nut member N-2 and a spring device D-2.

The housing H-2 includes a tubular wall 60, end walls 61 and 62 and an internal partition 63 located intermediate the end walls.

The screw member S-2 extends through the end wall 61 into the housing H-2 and is provided at its inner end with a ring type screw 70 affixed thereto and having external square threads 71.

The device D-2 includes a first ring member 73 provided with an internally threaded annular flange 74; and a second ring member 75 spaced from and coaxial with the member 73 and provided with an internally threaded annular flange 76. A tubular member 77 extends between the opposed flanges 74 and 76, is threadably connected thereto and is internally threaded for mating engagement with the threads 71 of the ring screw 70. The ring members 73 and 75 and the tubular member 77 are said to constitute elements of an internal housing H-3.

A cylindrical post 78, having a head 79, extends through the center of the ring member 75 and is affixed to the end wall 62; and a spacer 81 is interposed between the ring member 75 and the end wall 62.

In use, the above described prior art device adapts to normal thermally induced changes in the positions of the associated piping through axial movement of the screw member S-2 relative to the nut member N-2 and the internal housing H-3, thereby adjusting the effective length of the device as required. However, under shock load condtions the screw member S-2 and its associated elements will move bodily axially so that either the flange 48 of the tubular member 47 will abut the partition 63 or the ring member 75 will abut the head 79 of the post 78, depending on the direction of axial movement, to convert the device into a rigid support so long as the shock loading continues, after which the disc springs 54 return the axially movable elements to the position shown in FIG. 1.

In the above described construction of the prior art device of FIG. 1 it will be noted that the relatively long outwardly projecting free end portion of the screw member S-2 is virtually unsupported; relative axial movement can take place between the tubular part 47 of the nut member N-2 and the ring member 73 of the device D-2; there is apt to be binding between the partition 63 and the associated portion of the tubular member 47, as is the case with respect to the ring member 75 and the post 78; but, more importantly, the square thread relationship between the ring screw 70 and the internal threads of the tubular member 77 is such that frictional resistance is high and there is no real possibility of release when subjected to continuing forces that might be imposed after an initial shock load.

The above noted deficiencies are overcome by the improved mechanical shock and sway arrestor of this invention which, as illustrated in FIG. 2 of the drawings, includes an outer housing generally indicated 105 comprising a tubular body 106, and end closure 107 having a central aperture (not numbered) for reception of one end of a ball screw, as will be hereinafter more fully described, and an end closure 108 having a central threaded aperture (not numbered) for retention of a post axle as will be hereinafter more fully described. Either or both of the end closures 107, 108 may be removable. The end closure 108 is provided with a longitudinally projecting lug 109 for connection either to the piping or to the stationary support, depending on the installation orientation of the arrestor as a whole.

A ball screw 110 is reciprocably mounted through the central aperture of the end closure 107 and has its outer end projecting beyond the outer face of that end closure for connection with either the piping or the stationary support and its inner end projecting axially into the housing 105.

A cylindrical ball nut 111 is operatively associated with the ball screw 110 and is nominally positioned with its left end (as viewed in FIG. 2) in juxtaposition with the inner face of the end closure 107 and with clearance therebetween.

A relatively thick-walled tubular extension 112 has one end threadably secured or otherwise affixed over the right end (as viewed in FIG. 2) of the ball nut 111 and has its free end closed by a threaded cap 113 provided with a central aperture (not numbered) having an annular ball bearing 114 retained therein and having its outer face in juxtaposition to the inner face of the end closure 108 with clearance therebetween.

The inner (left as viewed in FIG. 2) end of the tubular extention 112 and the outer (right) end of the ball nut 111 are rotatably supported by an annular ball bearing 115 fitted within the tubular body 106 of the housing 105. The outer (right as viewed in FIG. 2) end of the tubular extension 112 and the cap 113 are rotatably supported by a post axle 116, having a head 117. The post axle 116 passes through the ball bearing 114 of the cap 113 and is threadably engaged in the central aperture of the end closure 108 for longitudinal adjustment relative thereto. The longitudinal adjustment of the post axle 116 to a predetermined position normally is done at the time of assembly of the arrestor, but if it is desired to provide for readjustment after assembly or after installation, the outer exposed end of the axle may be provided with hexagonal socket for reception of a so-called "Allen" set screw tool.

A pair of disk springs 118, 118 are mounted coaxially around the post axle 116 and are disposed on opposite faces of the cap 113 to maintain the rotatable mass comprising the ball nut 111, the tubular extension 112 and the cap 113 in its normal longitudinally centralized position, as shown in FIG. 2, in which the left end of the ball nut 111 is spaced from the adjacent face of the end closure 107 and in which the right face of the cap 113 is spaced from the adjacent face of the end closure 108.

The preset relation between the disk springs 118, 118 and their associated elements 108, 113 and 117 through adjustment of the post axle 116 is such that, under a no-load condition of the arrestor, a small amount of axial play of the rotatable mass comprising the elements 111, 112 and 113 can take place.

The tubular extension 112 is internally threaded with female threads 119 of square or rectangular cross-section and having a pitch the same as that of the ball screw 110 and its associated nut 111.

A one turn ball screw centering element generally indicated 120 is affixed to the inner free end of the ball screw 110 and includes a rounded thread 121 which is engaged within the square or rectangular threads 119 of the tubular extension 112. The convexity of the thread 121 is such that only line contact may be made between it and the adjacent surfaces of the threads 119 and the longitudinal thickness of the thread 121 is such as to provide limited clearance relative to the threads 119, thus enabling the rotatable mass of the combined elements 111, 112 and 113 to accommodate small amplitude linear or axial vibrations without causing any change in the effective length of the ball screw 110 which otherwise might occur as the result of rotation of the rotatable mass if such clearance did not exist.

Upon installation, the rotatable and reciprocable mass of the combined elements 111, 112 and 113 is in the longitudinally central position as shown in FIG. 2.

If the piping undergoes any slow change of position due to thermally induced expansion or contraction, that change will cause a correspondingly slow axial movement of the ball screw 110 which imparts a correspondingly slow rotation of the ball nut 111 and its associated elements 112 and 113, thus progressively changing the effective length of the arrestor as a whole.

Now, if the piping should be subjected to minor vibration of low amplitude, such vibration is readily accommodated without any change in the effective length of the ball screw 110 and the arrestor as a whole as the result of the limited clearance between the thread 121 of the element 120 and the internal threads 119 of the tubular extension 112, the limited axial play provided between the ball screw 110 and the ball nut 111, and the limited axial play permitted by the disk springs 118.

However, when the piping is subjected to shock loading or vibration of substantial amplitude, such condition immediately is transmitted to the housing 105 and the ball screw 110 in such a manner that the thread 121 of the element 120 first abuts against one or the other of the walls of the internal threads 119, depending on the direction of movement, after which further movement of the ball screw 110 bodily carries with it the rotatable mass comprising the elements 111, 112 and 113 against the resistance of one or the other of the disk springs 118, so that either the ball nut 111 abuts against the end closure 107 or the cap 113 abuts substantially against the end closure 108, thus substantially instantly converting the entire arrestor into a rigid strut for the duration of such shock loading or vibration. When the shock loading or vibration ceases, the disk springs 118 effect an axial recentering of the rotatable mass comprising the elements 111, 112 and 113 to the position shown in FIG. 2.

The low friction contact between the thread 121 and the contacted wall of the threads 119 and the use of the ball bearings 114 and 115, enables the arrestor, when functioning as a rigid strut, to provide relief within its design limits whenever abnormal forces, such as those caused by a seismic distrubance, are applied; and such relief is effected by a forced axial movement of the ball screw 110 in the direction of the applied force and a concurrent rotation of the rotatable mass comprising the elements 111, 112 and 113 to lengthen or shorten the effective length of the arrestor as required to ease the applied continuing force.

If experience should indicate that the friction relation between the thread 121 and the walls of the threads 119 is still too high in the construction of FIG. 2 to enable the above described relief readily to take place, the friction may be further reduced by modifying the structure of the thread 121.

Figure 3:
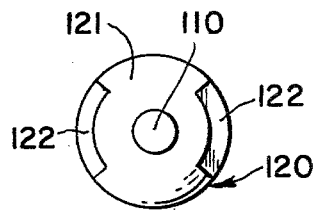
FIG. 3 is a detail end elevation of a modification of the single turn threaded element affixed to the inner end of the ball screw.

One way of effecting this is shown in FIG. 3 in which symmetrically opposed engaging portions of the thread 121 are relieved as at 122, 122, thus in effect making the engaging portions of the thread discontinuous and reducing the length of the line contact between them and the associated wall portions of the internal threads 119.

Another way of effecting this is shown in FIG. 4 in which the engaging portions of the thread 121 are provided a plurality of opposed pairs of anti-friction bearing balls 123, 123 disposed in spaced relation along the line of contact between the engaging portions of the thread 121 and the associated wall portions of the internal threads 119.

It should be understood that the desired limited axial play between the ball screw 110 and the ball nut 111 is effected through the use of undersized balls in the grooves, which also reduces friction and prolongs the life of the ball screw ball nut assembly. The friction at the ball screw ball nut assembly may be further reduced, if desired or necessary, by having the ball nut 111 threaded with "Acme" threads, thereby providing line contact between the balls and the walls of the nut threads rather than area contact.

Further, it may be desirable to provide a limited amount of axial play between the ball nut 111 and the tubular extension 112. If so, a simple way to effect this is shown in FIG. 5 in which the left end of the tubular extension 112 is slip-fitted over the right end of the ball nut 111 and is connected thereto by at least one pair of symmetrically opposed radial pins 124,124 having their inner ends projecting into short longitudinally extending recesses 125 formed in the ball nut 111.

It is of course to be understood that variations in arrangements and proportions of parts may be made within the scope of the appended claims.

I claim:

1. A mechanical shock and sway arrestor adapted to be interposed between piping and a stationary support for said piping and including; a tubular housing having first and second end closures each having inner and outer faces, said first end closure being provided with a central aperture for reception of a ball screw, said second end closure being provided with an outwardly projecting longitudinally extending connection lug; a ball screw of predetermined pitch inserted through the said central aperture of said first end closure and having its outer end projecting beyond the outer face of said first end closure whereby to serve as a connector and having its inner end terminating within said tubular housing; a ball nut threadably engaged over said ball screw within said tubular housing and having one end normally disposed in spaced juxtaposition to the inner face of said first end closure; an axially disposed tubular extension having one end affixed to that end of said ball nut that is away from said first end closure and having its other end terminating in proximity to said second end closure, a cap closing the said other end of said tubular extension and having a central aperture for the reception of a post axle, the inner wall of said tubular extension being provided with female threads of square cross-section and having a pitch the same as that of said ball screw; said cap having inner and outer faces, the outer face being normally disposed in spaced juxtaposition to the inner face of said second end closure; a headed post axle engaged through the said central aperture of said cap and threadably engaged with said second end closure for longitudinal adjustment relative thereto; a pair of disk springs mounted coaxially with respect to said post axle and disposed on opposite faces of said cap, said disk spring being normally effective to maintain the assembly comprising said ball nut, said tubular extension and said cap centered between the inner faces of said first and second end closures; and a centering and supporting element affixed to the said inner end of said ball screw and provided with a thread engaging the internal threads of said tubular extension, the engaging portions of the thread of said centering and supporting element being of convex configuration whereby to provide only line contact with the associated walls of said internal threads.

2. The shock and sway arrestor of claim 1 in which the engaging portions of the thread of said centering and supporting element are discontinuous.

3. The shock and sway arrestor of claim 1 in which the engaging portions of the thread of said centering and supporting element are provided with a plurality of anti-friction balls disposed in spaced relation along the line of engagement between said thread and the associated wall portions of said internal threads.

4. The shock and sway arrestor of claim 1 in which the assembly comprising said ball nut, said tubular extension and said cap is rotatably supported by anti-friction bearings.

5. The shock and sway arrestor of claim 4 in which said anti-friction bearings are ball bearings.

* * * * *